(12) United States Patent
Thorne, III et al.

(10) Patent No.: US 7,805,816 B1
(45) Date of Patent: Oct. 5, 2010

(54) CARGO STRAP

(75) Inventors: Allan Thorne, III, 6413 Ashley St., Felton, CA (US) 95018; Craig S. Hines, San Francisco, CA (US)

(73) Assignee: Allan Thorne, III, Felton, CA (US)

( * ) Notice: Subject to any disclaimer, the term of this patent is extended or adjusted under 35 U.S.C. 154(b) by 931 days.

(21) Appl. No.: 11/607,840

(22) Filed: Nov. 28, 2006

Related U.S. Application Data

(60) Provisional application No. 60/597,375, filed on Nov. 28, 2005.

(51) Int. Cl.
*A44B 13/00* (2006.01)
*F16B 45/00* (2006.01)
*A44B 99/00* (2010.01)

(52) U.S. Cl. .................. 24/301; 24/300; 24/265 H

(58) Field of Classification Search .............. 24/3.3, 24/301, 300, 265 H, 265 BC, 265 EC
See application file for complete search history.

(56) References Cited

U.S. PATENT DOCUMENTS

| | | | |
|---|---|---|---|
| 190,535 A | 5/1877 | Armstrong | |
| 1,924,992 A | 8/1933 | Jasper | |
| 2,372,967 A | 4/1945 | Martin | |
| 2,500,561 A * | 3/1950 | Norton | 24/300 |
| 2,670,951 A | 3/1954 | Lucky | |
| 2,800,696 A | 7/1957 | Aicher | |
| 2,832,358 A | 4/1958 | Chambers | |
| 2,991,524 A | 7/1961 | Dobrikin | |
| 3,174,787 A | 3/1965 | Kolman | |
| 3,672,004 A | 6/1972 | Smith | |
| 3,718,947 A | 3/1973 | Huber | |
| 3,913,178 A | 10/1975 | Ballin | |
| 4,200,190 A | 4/1980 | Tyson | |
| 4,266,867 A | 5/1981 | Reeberg | |
| 4,426,908 A | 1/1984 | Ullmann | |
| 4,466,159 A | 8/1984 | Burrage | |
| 4,559,677 A | 12/1985 | Tracy | |
| 4,573,842 A | 3/1986 | Mantela | |
| 4,606,687 A | 8/1986 | Mantela | |
| 4,648,159 A | 3/1987 | Dougherty | |
| 4,769,875 A | 9/1988 | Hartman | |
| 4,860,408 A | 8/1989 | Johnson | |
| 5,014,369 A | 5/1991 | Daus | |
| D317,251 S | 6/1991 | Liang | |
| 5,113,981 A | 5/1992 | Lantz | |
| 5,195,216 A | 3/1993 | Ishii | |
| 5,195,217 A | 3/1993 | Arntzen | |
| 5,253,393 A | 10/1993 | Levin | |
| 5,308,101 A | 5/1994 | Monty | |
| 5,325,568 A | 7/1994 | Bruhm | |

(Continued)

OTHER PUBLICATIONS http://www.lockitt.com/AccessTieDown1.htm, Mar. 29, 2006.

(Continued)

*Primary Examiner*—Robert J Sandy
(74) *Attorney, Agent, or Firm*—Standley Law Group LLP

(57) ABSTRACT

A one-piece, adjustable elastic strap for securing items, which may include overmolded attachment members. The attachment members may be reinforced, and anchor holes may be provided along the elastic member. In addition, non-slip grips may be provided on the overmolded portions to facilitate gripping. Other safety features may also be included.

40 Claims, 3 Drawing Sheets

U.S. PATENT DOCUMENTS

| | | | |
|---|---|---|---|
| 5,448,805 | A | 9/1995 | Allen et al. |
| 5,638,584 | A | 6/1997 | De Anfrasio |
| 5,639,000 | A * | 6/1997 | McDaniel et al. ............ 24/301 |
| 5,673,464 | A | 10/1997 | Whittaker |
| 5,682,652 | A | 11/1997 | Brody et al. |
| 5,688,011 | A | 11/1997 | Gulley |
| 5,740,764 | A * | 4/1998 | Jacobsen .................... 119/798 |
| 5,852,849 | A * | 12/1998 | Lansing et al. ................ 24/3.4 |
| 6,014,794 | A | 1/2000 | Mc Coy |
| 6,389,655 | B2 | 5/2002 | Libecco |
| 6,397,865 | B1 | 6/2002 | Wilson et al. |
| 6,543,096 | B2 | 4/2003 | Settelmayer et al. |
| 6,675,447 | B1 | 1/2004 | Hofeldt |
| 6,698,030 | B2 | 3/2004 | Cutler |
| 6,783,312 | B2 | 8/2004 | Smith |
| 6,807,715 | B1 | 10/2004 | Blair |
| 6,908,131 | B2 | 6/2005 | Main et al. |
| 6,935,742 | B1 | 8/2005 | Wilson, Sr. |
| 7,093,329 | B1 * | 8/2006 | Chiu ........................... 24/301 |
| 2001/0001340 | A1 | 5/2001 | Libecco |
| 2001/0009637 | A1 | 7/2001 | Schrader |
| 2001/0054219 | A1 | 12/2001 | Settelmayer et al. |
| 2002/0032953 | A1 | 3/2002 | Maurer |
| 2003/0001398 | A1 | 1/2003 | Koeniger |
| 2003/0186024 | A1 | 10/2003 | Walsh |
| 2003/0190209 | A1 | 10/2003 | Smith |
| 2003/0201377 | A1 | 10/2003 | Davis |
| 2004/0212209 | A1 | 10/2004 | Vitoorapakorn |
| 2005/0050695 | A1 | 3/2005 | Mackey et al. |
| 2005/0115654 | A1 | 6/2005 | Badham |

OTHER PUBLICATIONS http://www.keepercorp.com/easy_as_123.htm, Mar. 29, 2006.
http:://www.montanajacks.com/index.asp?PageAction=VIEWPROD&ProdID=409.
http://www.missgrizz.com/php/keeper.php, Mar. 29, 2006.
http://usfreight.zoovy.com/category/tiedownaccessories, Mar. 29, 2006.
http://www.colemans.com/tiedown.htm Mar. 29, 2006.
http://www.totalfitnessfl.com/fit/Rope_Polypropylene_100_z42121_383.php.
http://www.labsafety.com/search/product_group.asp?dept_id=38126, Mar. 29, 2006.
http://www.certifiedslings.com/catalog/featuredproduct.shtml, Apr. 10, 2006.
http://www.cargogear.com/Straps_and_Tiedowns/Straps_andTiedowns.htm.
http://www.cargogear.com/RopeStrapBungeeCAT.asp?find=HITRIPCORD18#HITRIPCORD18, Apr. 10, 2006.
http://www.drawtite.com/adrststco.html, Apr. 10, 2006.
http://www.pensafe.ca/english_index.html, Apr. 10, 2006.
http://www.highlandusa.com/category_products.asp?id=104, Apr. 10, 2006.
http://www.highlandusa.com/category.asp?id=128, Apr. 10, 2006.
http://www.realtruck.com/productline/353/239/1/highland_bungee_cords_triple_strength.html, Apr. 10, 2006.
http://www.redtrailers.com/ShwoItem.asp?id=91223900, Apr. 10, 2006.
http://industrie.jobert.free.fr/site/UK/produits/sandows.m221.htm, Apr. 10, 2006.
http://industrie.joubert.free.fr/site/UK/produits/accessoire/m29a.htm, Apr. 10, 2006.

* cited by examiner

CARGO STRAP

This application claims the benefit of U.S. Provisional Application No. 60/597,375, filed Nov. 28, 2005, which is hereby incorporated by reference in its entirety.

BACKGROUND AND SUMMARY OF THE INVENTION

The present invention relates generally to straps for securing or restraining items or for any other suitable use. For example, an exemplary embodiment of a strap may be used for securing gear, cargo, or any other suitable item that needs to be secured or restrained. Other uses are also possible and considered to be within the scope of the present invention. Thus, it is not intended to limit an exemplary embodiment of a strap to any particular use, unless expressly claimed otherwise.

For example, when transporting gear, cargo, or other items on a moving vehicle, it often becomes necessary to restrain the items from movement due to, among other things, directional changes, vibrations, or the wind. Further, people often use straps to tie down the trunk lid for items that are too large to fit within a closed trunk. In addition, people often tie oddly shaped items to the top of the vehicles or in a truck-bed.

Currently, a wide variety of strapping devices are in wide use for securing cargo on vehicles, tying down trunk lids, and holding down tarpaulins, tents, and other miscellaneous items. Examples of these strapping devices include bungee cords, woven synthetic straps, chains, and ropes. Bungee cords are generally formed as elongate, tubular elastic members, and some include a fabric covering. These bungee cords typically include a hook disposed at each end.

Some present examples of elastic straps have a common method of manufacture. Such elastic straps are commonly made from a material called Ethylene Propylene Diene Monomer (i.e., EPDM). EPDM has traditionally been compression molded to create many current elastic straps on the market. A high temperature is needed to compression mold EPDM material into a desired shape. Many other materials cannot withstand such a high temperature, thereby making it difficult to bond EPDM to other materials. Consequently, holes are commonly provided in the ends of some EPDM compression molded elastic straps, which receive metal hooks to form many of the adjustable elastic straps on the market today.

Additionally, in the manufacture of elastic straps utilizing EPDM, during the compression molding process there may exist air pockets that never get filled with the EPDM material, thereby weakening the final product. Also, there may exist a certain high degree of scrap loss due to the cutting of the EPDM to size. Furthermore, the manufacturing time for EPDM tie-down straps is to a large measure dependant upon EPDM's drying time.

Each of the above elastic straps such bungee cords have drawbacks. A common drawback of many elastic straps such as bungee cords is the dangerously perched metal hooks at the ends of the straps. From overuse or improper use, these hooks have a dangerous tendency to snap off, bend, straighten out, or disengage from the strap. These malfunctions present a danger to the user, particularly ocular and other types of bodily injury. In fact, there exist multiple articles and studies done on eye injuries resulting from metal hooks that bend or otherwise malfunction when the straps are stretched.

Another common drawback of many elastic straps is that it is difficult for the user to stretch the strap to its maximum capability in order to secure an object due to the strap's slippery, elongated, cylindrical design. The more tension the user places upon the strap to stretch it, the more difficult it is for the user to actually hold onto it while attempting to secure or restrain an item. Since the strap at its maximum stretch capacity is also at its most difficult to grasp and hold, there exists the greatest danger for the strap to slip out of the user's hand and wildly snap an end of the strap with a hook, thereby presenting a significant risk of injury to those nearby. In addition, many common elastic straps, particularly excessively aged straps, may break when stretched, which also presents a major risk of injury to those nearby. A common problem is that there are no warnings or notices on traditional elastic straps. As a result, users of common elastic straps may be unaware of the age, suggested life span, or maximum amount of tension under which common elastic straps may properly function.

Under any of the aforementioned situations, the end of the strap and hook may fly at speeds in excess of 60 miles per hour. Such velocity leaves little time for those nearby to react to prevent injury. Thus, there is a significant need for an improved strap that may reduce or eliminate some or all such drawbacks of common straps.

Yet another drawback common to many straps is the lack of available attachment locations on the device itself. For example, when tying down an object with a bungee cord, there typically exists limited anchoring positions to which one of the end hooks may attach. Furthermore, many straps provide significantly limited options for securing one strap to another strap.

Finally, a primary drawback to the chain tie down device is the chain's lack of elasticity and the chain's excessive weight compared with other devices.

Various tie-down straps have been devised, which fail to adequately address some of the drawbacks mentioned above. Accordingly, a great need has arisen for a versatile, adjustable, lightweight, one-piece, elastic tie-down device of which hooks or other attachment members disposed at each end of the device may not snap or disengage in any manner from the strap, thereby reducing or eliminating the potential for injury. Additionally, non-slip gripping areas for the hand are needed when the user attempts to stretch the elastic cord to its maximum capacity. Also, there is a need for warnings or notices on the body of the strap, so that users are properly informed for safe use of the strap. None of the currently-used strapping and hold-down devices have this combination of characteristics which would prove safer from malfunctioning or flying straps, hooks, or attachment members, as well as concurrently possessing a variety of multifunctional anchoring positions. An improved tie-down or strapping device having any combination of some or all of these characteristics would be safer and easier to use.

In view of the foregoing disadvantages inherent in known types of adjustable, elastic tie-downs, some exemplary embodiments of the present invention may provide for a lightweight, one-piece, adjustable, elastic strap with hooks or attachment members overmolded into at least one end of the strap creating an overmold casing, with non-slip grips on the outer surface of the resulting overmold casing. For instance, an adjustable, elastic strap of some exemplary embodiments of the present invention may include at least one hook or other attachment member, which may be at least one reinforcing metal (e.g., steel) component that is overmolded by a plastic material. The resulting hook or attachment member may extend from and be overmolded by an end of an elastic member. Furthermore, in some exemplary embodiments, anchor holes may be provided along the elastic member, and non-slip grips may be provided on the outer surface of any overmold casings. Furthermore, in some exemplary embodiments, warnings or notices (e.g., the manufacture date of the strap, the suggested life span, and/or the recommended maximum amount of tension) may be molded or otherwise provided on the elastic member. As a result, some exemplary embodiments of the present invention, which will be described subsequently in greater detail, may provide an improved, adjustable, elastic, one-piece strap for securing or restraining items, which may have many of the advantages of known adjustable straps while eliminating or reducing any or all of the drawbacks of such straps.

In one exemplary embodiment, the hooks or attachment members at each end of an elongated, elastic strap may be comprised of a plastic material (e.g., rubber) within which is a reinforcing metal rod, thereby adding strength. For example, each molded hook may have a "U" shaped end and a relatively straight shaft end. Furthermore, in some exemplary embodiments, each molded hook or attachment member also may have multiple holes in the body or base of the plastic molding of the hook or attachment member, which may itself be overmolded via a suitable molding process (e.g., injection molding). These holes in the body or base of the hook or other attachment member may allow the overmolded material from the molding process to flow through the holes, thereby uniting the elastic member and the hook or other attachment member. For example, the overmolded plastic may bond (e.g., due to resin compatibility or the use of a bonding agent such as an adhesive or an epoxy) with the hook or other attachment member. The resultant overmolded area may be called an overmold casing. In such exemplary embodiments, this manufacturing method may secure hooks or other attachment members to each end of the elastic member, uniting the elastic member and the hooks or other attachment members as a single unit, via overmold casings. For example, the hooks or other attachment members on the ends of the elastic member may face in any desired direction(s) (e.g., the same or in opposite directions).

At each end of some exemplary embodiments of the elastic member, there may be raised ridges on the outer surface of the overmold casing, which may provide non-slip grip areas for the user's hand when the user stretches the elastic strap in order to secure an object. Optionally, a mid-point or other desired portion of the overmold casing may wider in diameter than either end of the elastic member. This expanded width may provide the user with a larger and ultimately safer and easier to use gripping area. Furthermore, an overmold casing may extend over a wide portion and a more narrow, distal portion of an attachment member, thereby reducing or eliminating a risk of the hook or other attachment member disengaging from the elastic member.

In some exemplary embodiments, there may openings along the body of the elastic member to allow for a secure place to insert hook ends when adjusting the strap or to allow for the combining of multiple hooks from other straps.

There may be no readily detachable parts of some exemplary embodiments of the present invention. Furthermore, the elastomer material (e.g., a thermoplastic elastomer) used for the body of the elastic member of some exemplary embodiments of the present invention may be easily colored while manufacturing the elastic strap. Also, the elastomer material may be adapted to glow in the dark.

Moreover, in an exemplary manufacturing method of a continuous, single-piece design, the materials used in the construction of the strap and an injection molding method of construction may allow for any or all of the following: (1) faster production cycles than that of the known art due to the faster drying times of the materials used in the injection molding process; (2) tighter tolerances (e.g., filling of airspace) because injection molding uses a fluid version of a plastic material (e.g., rubber) which pours into empty spaces, whereas EPDM is typically compression molded and sometimes contains air pockets within the compression molded object; (3) minimum scrap losses because molds may be pre-made exactly to specifications and poured therein; (4) the customization of the strength and rigidity of the elastic strap because ingredients (e.g., additives which harden or soften the elastomer) are available to be provided in the fluid plastic; and (5) a greater end product selection because the injection molding process (which may use lower temperatures) combined with the use of suitable plastics (e.g., thermoplastic rubbers or other plastics which may harden at lower temperatures) may facilitate the manufacture of improved products. Nevertheless, it should still be recognized that some exemplary embodiments of the present invention may utilize EPDM or may be manufactured using compression molding, unless expressly claimed otherwise.

Thus, in summary, an exemplary embodiment of the present invention may provide a new adjustable, lightweight, elastic tie-down strap that may prove to be safer from malfunctioning or flying hooks or other attachment members.

An exemplary embodiment of the present invention may provide a new adjustable, lightweight, elastic tie-down strap having molded rubberized hooks which are reinforced by a pre-bent metal rod and disposed on either end of the strap via overmolding, so that no parts comprising this exemplary tie-down strap may be detached without extreme difficulty or deliberateness during normal use. Other exemplary embodiments may simply include a metal or plastic hook or other attachment member. Other suitable materials may also be used in the manufacture of a hook or other attachment member in some exemplary embodiments of the present invention.

An exemplary embodiment of the present invention may also provide a new adjustable, lightweight, elastic tie-down strap with non-slip grips on either end of the strap and on the outer surface of the associated overmold casing, so that there will be less chance for the strap to slip out of the user's grip.

Furthermore, an exemplary embodiment of the present invention may provide a new adjustable, lightweight, elastic tie-down strap with an overmold casing that has the width substantially great enough to provide a large gripping area thereby creating a safer, easier to use strap.

In addition, an exemplary embodiment of the present invention may provide a new adjustable, lightweight, elastic tie-down strap with at least one attachment location for the strap's own hooks or for which to combine the hooks of multiple other straps.

An exemplary embodiment of the present invention may also provide a new adjustable, lightweight, elastic tie-down strap for securing gear/cargo that may be easily colored or glow in the dark to allow for new design opportunities in consumer applications.

Furthermore, an exemplary embodiment of the present invention may provide a new adjustable, lightweight, elastic tie-down strap to secure gear/cargo which may be easily and efficiently manufactured and marketed.

Moreover, an exemplary embodiment of the present invention may provide a new adjustable, lightweight, elastic tie-down strap to secure gear/cargo which may be constructed of a wide range of materials.

Finally, an exemplary embodiment of the present invention may provide a new adjustable, lightweight, elastic tie-down strap for securing gear/cargo that provides some or all of the advantages of the known art, while simultaneously overcoming some or all of the disadvantages normally associated therewith.

These advantages, together with other advantages and novel features of exemplary embodiments of the invention, are pointed out with particularity in the detailed description and claims forming a part of this disclosure. For a better understanding of exemplary embodiments of the invention, its operating advantages, and the specific advantages attained by its uses, reference should be made to the accompanying drawings and descriptive matter in which there are illustrated exemplary embodiments of the invention. In addition to the novel features and advantages mentioned above, other features and advantages will be readily apparent from the following descriptions of the drawings and exemplary embodiments.

BRIEF DESCRIPTION OF THE DRAWINGS

Similar reference characters denote corresponding features consistently throughout the attached drawings.

DETAILED DESCRIPTION OF EXEMPLARY EMBODIMENTS

Figure 1:
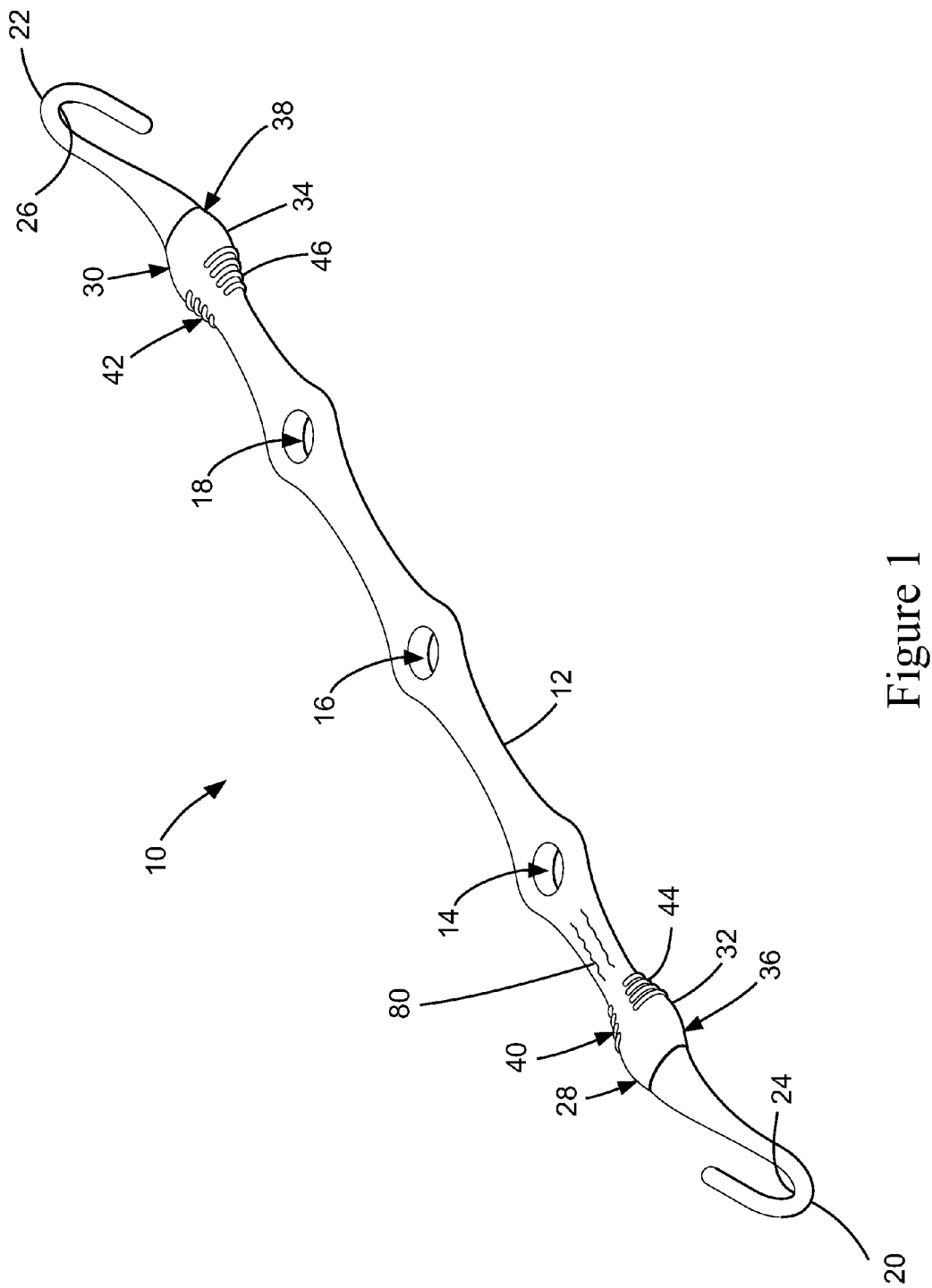
FIG. 1 is a perspective view of an exemplary embodiment of a strap of the present invention.

Referring now to the drawings, particularly to FIG. 1, there is shown one exemplary embodiment of an adjustable, lightweight, elastic tie-down strap 10 of the present invention. This exemplary embodiment of a tie-down strap may include a generally flat, elongated elastic member 12 that may define at least one anchor hole. In this exemplary embodiment, three anchor holes 14, 16, and 18 are provided in elastic member 12. It should be recognized that an elastic member of other exemplary embodiments may have any suitable shape, not limited to being elongated and generally flat, unless expressly claimed otherwise.

Additionally, the exemplary embodiment in FIG. 1 shows molded attachment members 20 and 22 disposed at respective ends of the elastic member 12. More particularly, attachment members 20 and 22 are hooks in this example, which may comprise U-shaped hook ends 24 and 26, respectively, and bases 28 and 30, respectively. In this exemplary embodiment, bases 28 and 30 underlie overmold casings 32 and 34, respectively, of elastic member 12. More particularly, in this exemplary embodiment, overmold casing 32 overmolds base 28 and a relatively narrow distal portion 36 of attachment member 20, and overmold casing 34 overmolds base 30 and a relatively narrow distal portion 38 of attachment member 22. Such an exemplary embodiment may assist with preventing the attachment members 20 and 22 from disengaging from elastic member 12. As shown in this example, the overmold casings 32 and 34 may include a portion designated as the 'non-slip grip' 40 and 42, respectively. On the outer surface of the non-slip grips 40 and 42 may be at least one protrusion, such as a raised ridge 44 and 46, respectively. In this example, each of the overmold casings includes a bed of raised ridges.

Other exemplary embodiments may include other types of attachment members. For instance, other examples of attachment members include, but are not limited to, hooks, carabiners, buckles, anchors, plugs, fasteners, connectors, clamps, and other suitable attachment members. Thus, it is not intended to limit attachment members to hooks, unless expressly claimed otherwise. Furthermore, an attachment member may have any desired configuration. In some exemplary embodiments, a hook may be configured like a hand, with a finger (e.g., an index finger) serving as the hook.

In this exemplary embodiment, the hooks are set in different directions. Nevertheless, it should be recognized that an attachment member may be situated in any desired position. For instance, in some exemplary embodiments, the attachment member may be situated in the same direction.

Figure 2:
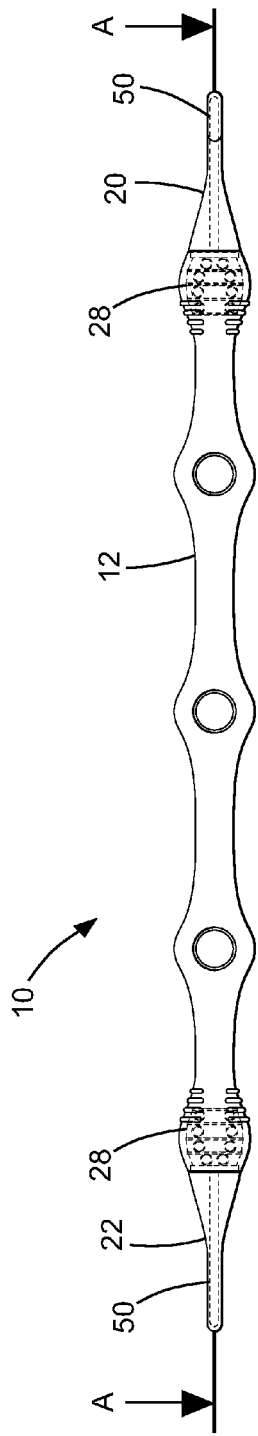
FIG. 2 is a top plan view of the strap of FIG. 1, with optional interior features shown in phantom.
Figure 3:
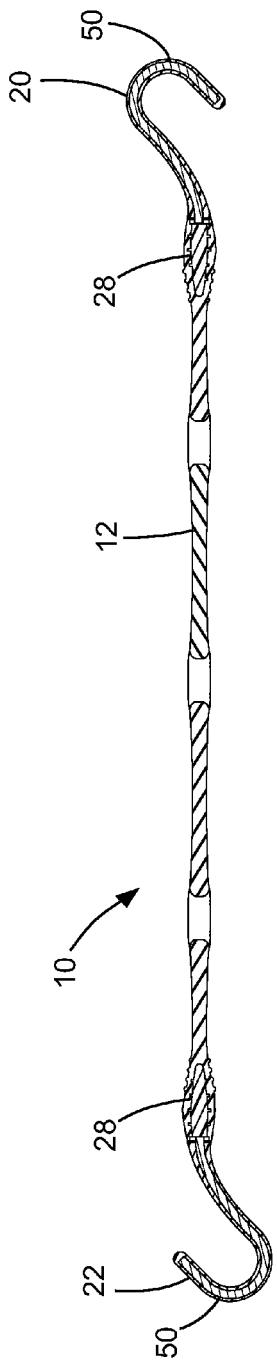
FIG. 3 is a cross sectional view of the strap along the line A-A of FIG. 2.
Figure 4:
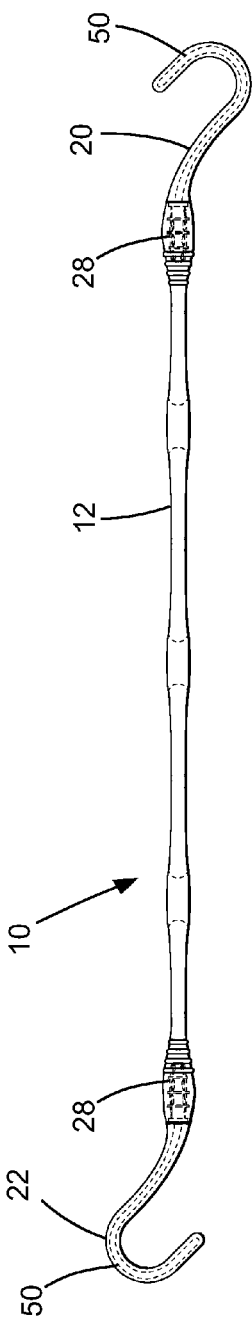
FIG. 4 is a side elevation view of the strap of FIG. 1, with optional interior features shown in phantom.
Figure 7:
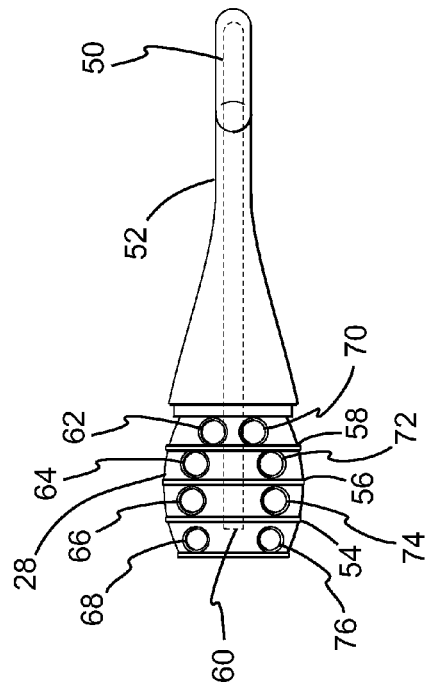
FIG. 7 is a top plan view of the attachment member of FIG. 5, with optional interior features shown in phantom.
Figure 8:
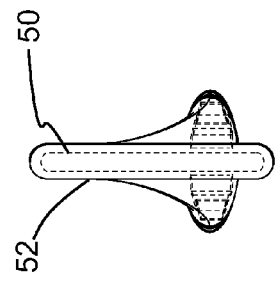
FIG. 8 is an end elevation view of the attachment member of FIG. 5, with optional interior features shown in phantom.
Figure 5:
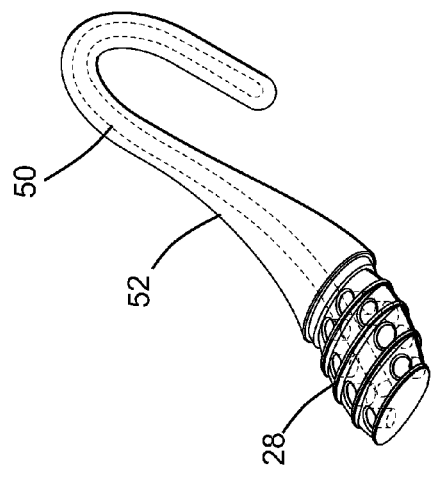
FIG. 5 is a perspective view of an attachment member, specifically a hook, of the strap of FIG. 1, with optional interior features shown in phantom.
Figure 6:
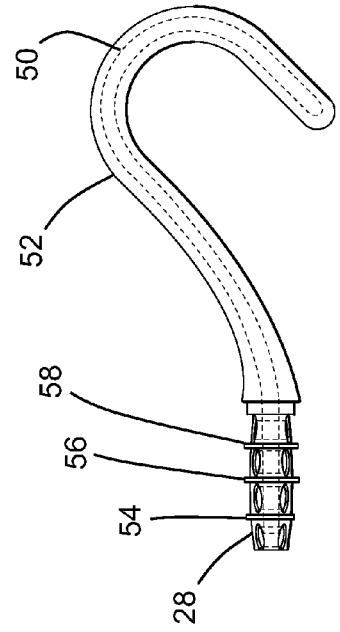
FIG. 6 is a side elevation view of the attachment member of FIG. 5, with optional interior features shown in phantom.

An exemplary embodiment of an elastic member may have any suitable length, width, and depth. FIGS. 2-4 show the length of this exemplary embodiment of a substantially flat, elongated member 12 may be substantially greater than its width. Furthermore, as shown in FIG. 4, this exemplary embodiment of a substantially flat, elongated member 12 may also have a depth that is substantially less than the width. The interior of this exemplary embodiment of strap 10 is shown in phantom in FIGS. 2-4 in order to assist with FIGS. 5-8 show the detail of exemplary hooks 20 and 22, with inner details again shown in phantom. For ease of description, FIGS. 5-8 will be described with reference to hook 20. More specifically, FIG. 5 shows a metal rod 50, which may be pre-shaped, within an overmolded plastic material 52. In this exemplary embodiment, plastic material 52 forms base 28 of hook 20. As shown in this example, base 28 may include at least one protrusion that may assist with preventing the disengagement of hook 20 from elastic member 12. In particular, this exemplary embodiment includes optional cylindrical support ribs or pillars 54, 56, and 58. FIG. 7 shows a clear view of the end 60 of metal rod 50 surrounded by plastic material 52. FIG. 7 also shows a clear view of holes 62, 64, 66, 68, 70, 72, 74, and 76 as part of base 28.

As will be described in greater detail hereafter, attachment members 20 and 22 may be made by injection molding in one exemplary method wherein a thermoplastic material such as polypropylene is overmolded onto a metal rod 50, thereby providing a reinforced, molded attachment member that may have improved resistance to breaking when under tension. Such a configuration may eliminate or significantly reduce a potential risk of injury.

A melted thermoplastic elastomer may be used to form the elastic member 12. In an exemplary embodiment, protrusions 54, 56, and 58 may provide increased surface area to which the melted thermoplastic elastomer material may bond, thereby providing for a stronger bond between the elastic member 12 and the plastic material 52.

Furthermore, in reference to the aforementioned holes 62, 64, 66, 68, 70, 72, 74, and 76, such holes may run completely through base 28 and may be parallel to each other. In an exemplary embodiment, these holes 62, 64, 66, 68, 70, 72, 74, and 76 may provide spaces into which melted thermoplastic elastomer material may flow, optionally bonding to plastic material 52. As a result, an interlock may be formed that eliminates or reduces the risk that an attachment member may disengage from an elastic member. Other exemplary embodiments may include any desired number of holes. Moreover, it should be recognized that the base in other exemplary embodiments may comprise at least one depressed portion that may be filled by a melted thermoplastic elastomer material, which may also help to eliminate or reduce the risk of injury.

By way of example, plastic material 52 may be a thermoplastic material. For instance, examples of plastic material 52 include, but are not limited to, polypropylene, polystyrene, ABS, nylon, polyethylene, PVC, and other suitable plastics. Other suitable alternatives are readily available. In an exemplary embodiment, plastic material 52 may be selected such that there is resin compatibility with elastic member 12, thereby promoting bonding. Optionally, an adhesive or other suitable bonding material may be used to facilitate bonding.

As will be described in greater detail hereafter, the tie-down strap 10 may made by an injection molding method. Such an exemplary method may facilitate the formation of improved anchor holes in the elastic member. In particular, an anchor hole in some exemplary embodiments may be sufficiently sized and shaped to accept a plurality of attachment members, which may improve the functionality of the strap by facilitating connection with other straps.

In this exemplary embodiment, the elastic member 12 is generally in an elongate, linear form. In other exemplary embodiments, an elastic member may have any desired configuration. For instance, an elastic member in some exemplary embodiments may form a circular shape, a web shape, or any desired number of extensions. Furthermore, an anchor hole may have any desired placement on an elastic member.

In an exemplary embodiment, elastic member 12 may optionally have maximum width around the anchor holes. Furthermore, elastic member 12 may optionally have minimum width between the anchor holes. Other configurations are also possible.

By way of example, elastic member 12 may be comprised of thermoplastic elastomers including, but not limited to, Rimflex, Dinaflex, Krayeon, Santoprene, and other suitable elastomers. Rimflex is a thermoplastic elastomer rubber material. It is commercially available, for example, under the trademarked product name "Rimflex" by a business entity doing business as the distributor Bay State Polymer, and is made by the business entity doing business as Synthetic Rubber Technologies. Synthetic rubbers other than thermoplastic elastomers may be used in alternative embodiments of the present invention. In one example, the strap may be comprised of a polypropylene molded hook and a Rimflex molded elastic member.

Molds for the above described embodiment can be made by methods commonly used in the mold making industry, and would be obvious to one skilled in the art of mold making. Optionally, such as shown in FIG. 1, a warning or notice label 80 may be provided on the elastic member 12. For example, the label may preferably be molded on the elastic member 12. Alternatively, the label may be stamped or printed on the elastic member. The label may provide information such as the manufacture date, the suggested product life span, the recommended maximum amount of tension, or any other suitable information.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A strap for securing items, said strap comprising:
   an elastic member comprising a first overmolded portion; and
   a first attachment member extending from said first overmolded portion of said elastic member such that said first attachment member is overmolded by said first overmolded portion of said elastic member;
   wherein said first attachment member comprises a base comprising at least one hole such that said first overmolded portion extends through said at least one hole of said base.

2. The strap of claim 1 wherein said first overmolded portion of said elastic member has at least one raised protrusion adapted to improve the ability to grip said first attachment member.

3. The strap of claim 1 wherein:
   said elastic member further comprises at least one anchor hole; and
   said anchor hole is adapted to receive said first attachment member of
   said strap or a substantially similar attachment member of another strap.

4. The strap of claim 3 wherein said anchor hole of said elastic member is adapted to receive a plurality of attachment members substantially similar to said first attachment member.

5. The strap of claim 1 wherein said elastic member is comprised of a thermoplastic elastomer material.

6. The strap of claim 1 wherein said elastic member is comprised of an elastomer material adapted to glow in the dark.

7. The strap of claim 1 wherein said elastic member consists essentially of a thermoplastic elastomer material.

8. The strap of claim 1 wherein said first attachment member is a hook.

9. The strap of claim 1 wherein said first attachment member is selected from the group consisting of hooks, carabiners, buckles, anchors, plugs, fasteners, connectors, and clamps.

10. The strap of claim 1 wherein said first attachment member comprises a metal component overmolded by a plastic material.

11. The strap of claim 10 wherein said first overmolded portion of said elastic member is bonded to said plastic material of said first attachment member.

12. The strap of claim 11 wherein said first overmolded portion of said elastic member is bonded to said plastic material of said first attachment member by resin compatibility.

13. The strap of claim 1 wherein said first attachment member comprises:
   a base having a wide portion; and
   a narrow portion relative to and distal from said wide portion of said base;
   wherein said first overmolded portion overmolds said wide portion of said base and said narrow portion.

14. The strap of claim 1 wherein said first attachment member comprises a base comprising at least one depressed portion such that said first overmolded portion extends into said at least one depressed portion of said base.

15. The strap of claim 1 wherein said first attachment member comprises a base comprising at least one protrusion such that said first overmolded portion extends over said at least one protrusion of said base.

16. The strap of claim 15 wherein said protrusion is a rib that extends around said base.

17. The strap of claim 1 further comprising a second attachment member extending from said elastic member such that said second attachment member is overmolded by a second overmolded portion of said elastic member.

18. The strap of claim 17 further comprising at least one additional attachment member extending from said elastic member such that said additional attachment member is overmolded by an additional overmolded portion of said elastic member.

19. The strap of claim 1 wherein said elastic member comprises a warning or notice label.

20. The strap of claim 19 wherein said warning or notice label is molded in said elastic member.

21. A strap for securing items, said strap comprising:
    an elastic member comprising an overmolded portion and at least one anchor hole; and
    an attachment member extending from said overmolded portion of said elastic member, said attachment member comprised of a plastic base that defines at least one hole;
    wherein said anchor hole of said elastic member is adapted to receive a plurality of attachment members substantially similar to said attachment member; and
    wherein said overmolded portion of said elastic member is bonded to and overmolds said base of said attachment member such that said overmolded portion extends through said hole of said base.

22. The strap of claim 21 wherein said attachment member is a hook.

23. The strap of claim 21 wherein said attachment member comprises a metal component overmolded by a plastic material.

24. The strap of claim 21 wherein said overmolded portion of said elastic member is bonded to said plastic base of said attachment member by resin compatibility.

25. The strap of claim 21 wherein said attachment member further comprises a narrow, distal portion relative to a wide portion of said base such that said overmolded portion of said elastic member overmolds said wide portion of said base and said narrow, distal portion.

26. The strap of claim 21 wherein said base of said attachment member comprises at least one protrusion such that said overmolded portion extends over said protrusion.

27. The strap of claim 26 wherein said protrusion is a rib that extends around said base.

28. A strap for securing items, said strap comprising:
    an elastic member comprising a first overmolded portion; and
    a first attachment member extending from said first overmolded portion of said elastic member such that said first attachment member is overmolded by said first overmolded portion of said elastic member;
    wherein said elastic member further comprises at least one anchor hole; and
    said anchor hole is adapted to receive said first attachment member of
    said strap or a substantially similar attachment member of another strap.

29. The strap of claim 28 wherein said anchor hole of said elastic member is adapted to receive a plurality of attachment members substantially similar to said first attachment member.

30. The strap of claim 28 wherein said elastic member is comprised of a thermoplastic elastomer material.

31. The strap of claim 28 wherein said elastic member consists essentially of a thermoplastic elastomer material.

32. The strap of claim 28 wherein said first attachment member is a hook.

33. The strap of claim 28 wherein said first attachment member is selected from the group consisting of hooks, carabiners, buckles, anchors, plugs, fasteners, connectors, and clamps.

34. The strap of claim 28 wherein said first attachment member comprises:
    a base having a wide portion; and
    a narrow portion relative to and distal from said wide portion of said base;
    wherein said first overmolded portion overmolds said wide portion of said base and said narrow portion.

35. The strap of claim 28 wherein said first attachment member comprises a base comprising at least one protrusion such that said first overmolded portion extends over said at least one protrusion of said base.

36. The strap of claim 28 further comprising a second attachment member extending from said elastic member such that said second attachment member is overmolded by a second overmolded portion of said elastic member.

37. The strap of claim 36 further comprising at least one additional attachment member extending from said elastic member such that said additional attachment member is overmolded by an additional overmolded portion of said elastic member.

38. The strap of claim 28 wherein a warning or notice label is molded in said elastic member.

39. A strap for securing items, said strap comprising:
    an elastic member comprising a first overmolded portion; and
    a first attachment member extending from said first overmolded portion of said elastic member such that said first attachment member is overmolded by said first overmolded portion of said elastic member;
    wherein said first attachment member comprises a base comprising at least one protrusion such that said first overmolded portion extends over said at least one protrusion of said base, wherein said protrusion is a rib that extends around said base.

40. A strap for securing items, said strap comprising:
    an elastic member comprising a first overmolded portion;
    a first attachment member extending from said first overmolded portion of said elastic member such that said first attachment member is overmolded by said first overmolded portion of said elastic member;
    a second attachment member extending from said elastic member such that said second attachment member is overmolded by a second overmolded portion of said elastic member; and
    at least one additional attachment member extending from said elastic member such that said additional attachment member is overmolded by an additional overmolded portion of said elastic member.

* * * * *